United States Patent
Fukuda

(10) Patent No.: US 9,329,821 B2
(45) Date of Patent: May 3, 2016

(54) PRINTING APPARATUS, METHOD OF CONTROLLING PRINTING APPARATUS, AND STORAGE MEDIUM FOR DISPLAYING PRINT JOB PROCESSING TIME

(71) Applicant: CANON KABUSHIKI KAISHA, Tokyo (JP)

(72) Inventor: Shin Fukuda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/306,833

(22) Filed: Jun. 17, 2014

(65) Prior Publication Data
US 2014/0368877 A1    Dec. 18, 2014

(30) Foreign Application Priority Data
Jun. 18, 2013  (JP) .................................. 2013-127238

(51) Int. Cl.
 *G06F 3/12*    (2006.01)
(52) U.S. Cl.
 CPC ............ *G06F 3/1259* (2013.01); *G06F 3/1207* (2013.01); *G06F 3/1217* (2013.01); *G06F 3/1229* (2013.01); *G06F 3/1282* (2013.01)
(58) Field of Classification Search
 CPC .............................. G06F 3/1259; G06F 3/1207
 USPC ................................ 358/1.13–1.14, 1.16, 1.9
 See application file for complete search history.

(56) References Cited

U.S. PATENT DOCUMENTS

| | | | | |
|---|---|---|---|---|
| 5,465,354 | A * | 11/1995 | Hirosawa et al. | 718/106 |
| 6,094,546 | A * | 7/2000 | Nakazato et al. | 399/1 |
| 7,336,405 | B2 * | 2/2008 | Dan | 358/503 |
| 7,653,329 | B2 * | 1/2010 | Sasai | G03G 15/50 399/127 |
| 8,542,392 | B1 * | 9/2013 | Fukasawa | 358/1.15 |
| 8,860,995 | B2 * | 10/2014 | Sakuragi et al. | 358/1.15 |
| 2002/0039195 | A1 * | 4/2002 | Miyake | 358/1.15 |
| 2003/0005023 | A1 * | 1/2003 | Gilbert et al. | 709/101 |
| 2004/0145768 | A1 * | 7/2004 | Stringham | 358/1.14 |
| 2007/0242301 | A1 * | 10/2007 | Tsuchie et al. | 358/1.14 |
| 2010/0214602 | A1 * | 8/2010 | Moriwaki | 358/1.15 |
| 2011/0090517 | A1 * | 4/2011 | Togawa | 358/1.1 |
| 2011/0221820 | A1 * | 9/2011 | Shibata | 347/17 |
| 2011/0242557 | A1 * | 10/2011 | Sato | 358/1.9 |
| 2011/0296425 | A1 * | 12/2011 | Fukuda et al. | 718/102 |

FOREIGN PATENT DOCUMENTS

JP     2004-330781 A    11/2004

* cited by examiner

*Primary Examiner* — Benny Q Tieu
*Assistant Examiner* — Quyen V Ngo
(74) *Attorney, Agent, or Firm* — Canon USA, Inc. IP Division

(57) ABSTRACT

A printing apparatus includes a storing unit configured to store a job, a printing unit configured to print the job, an acquiring unit configured to acquire a preparation time for the printing unit to become a print-ready state, a determining unit configured to determine a print time for the printing unit to process the job, a specifying unit configured to specify a time for processing the job stored in the storing unit based on the preparation time acquired by the acquiring unit and the print time determined by the determining unit, and a displaying unit configured to display a job execution schedule indicating the job processing time specified by the specifying unit.

9 Claims, 15 Drawing Sheets

FIG.3

| CURRENT TEMPERATURE OF FIXING UNIT (°C) | WARM-UP TIME (SECOND) |
|---|---|
| 0 | 360 |
| 5 | 345 |
| 10 | 330 |
| 15 | 308 |
| 20 | 287 |
| ⋮ | ⋮ |
| 165 | 9 |
| 170 | 4 |
| 175~ | 0 |

FIG.5

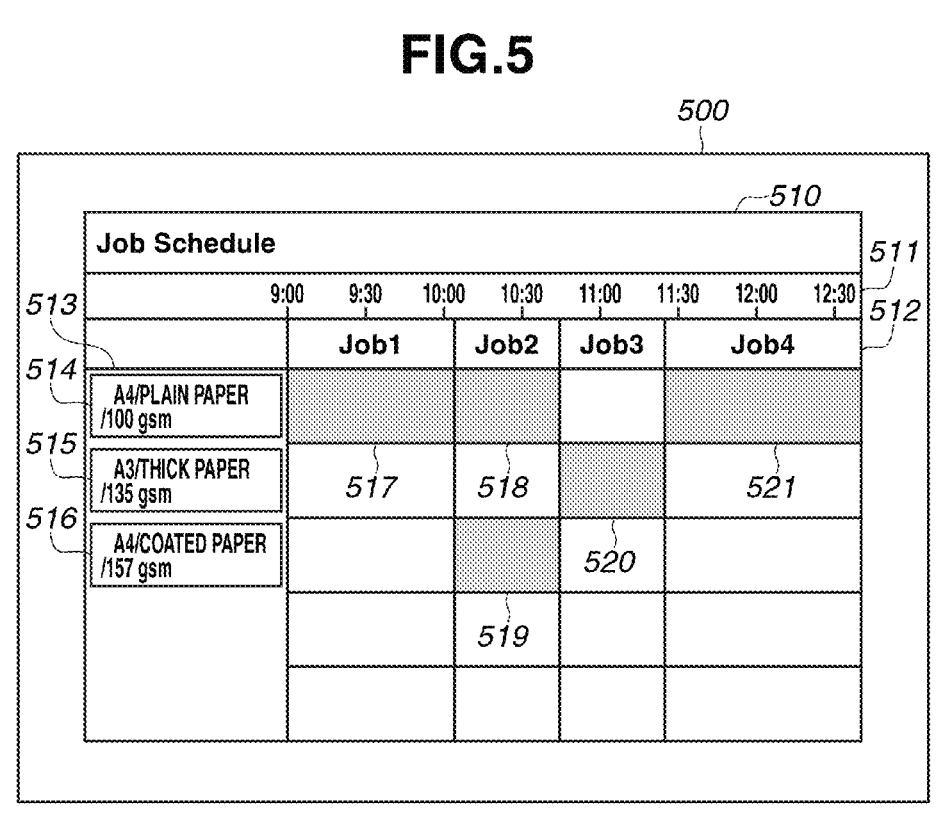

| Job Schedule | | | | | |
|---|---|---|---|---|---|
| | 9:00  9:30  10:00  10:30  11:00  11:30  12:00  12:30 | | | | |
| | Job1 | Job2 | Job3 | Job4 | |
| A4/PLAIN PAPER /100 gsm | ▓▓▓ | ▓▓▓ | | ▓▓▓ | |
| A3/THICK PAPER /135 gsm | 517 | 518 | | 521 | |
| A4/COATED PAPER /157 gsm | | ▓▓▓ | 520 | | |
| | | 519 | | | |
| | | | | | |

FIG.7

| TYPES OF PRINTING PAPER | FIXING UNIT TEMPERATURE NECESSARY FOR FIXING PROCESS |
|---|---|
| THIN PAPER | 165 |
| PLAIN PAPER | 175 |
| THICK PAPER | 185 |
| COATED PAPER | 190 |

| CURRENT TEMPERATURE OF FIXING UNIT (°C) | WARM-UP TIME (SECOND) |
|---|---|
| 0 | 369 |
| 5 | 354 |
| 10 | 339 |
| 15 | 317 |
| 20 | 296 |
| ⋮ | ⋮ |
| 165 | 18 |
| 170 | 13 |
| 175 | 9 |
| 180 | 6 |
| 185 | 3 |
| 190~ | 0 |

PRINTING APPARATUS, METHOD OF CONTROLLING PRINTING APPARATUS, AND STORAGE MEDIUM FOR DISPLAYING PRINT JOB PROCESSING TIME

BACKGROUND OF THE INVENTION

1. Field of the Invention

The present invention relates to a printing apparatus, a method of controlling the printing apparatus, and a storage medium.

2. Description of the Related Art

In the printing market called print on demand (POD) or production, a business system in which printing is preformed when an order is received from a customer, and the output product is surely supplied to the customer within the delivery date has been established. At such site of the printing market, a quick operation in the mass print production is a very important factor. For this reason, in many cases, an operator specifically trained for various operations is provided to a printing apparatus.

The operator manages operations expertly, for example, supply and replacement of consumable goods such as paper and toner, print job management, job ticket editing, transportation of output products, and finishing operations such as cutting and bookbinding. Among such operations, the operator needs to pay the most attention to maintain the operation rate of the printing apparatus to a high rate as much as possible.

For example, when a necessary consumable material has run out during print processing of a print job, the printing apparatus has to be stopped once by stopping a printing engine to stop the print processing. In such a case, the printing apparatus does not resume the printing processing until the operator has completed the supply and replacement of the necessary consumable material. In another case, when paper stacked on a discharge tray has reached to its maximum number of sheets that can be stacked thereon, the printing apparatus stops the printing engine to stop the print processing.

In this case, the printing apparatus does not resume the print processing until the operator removes a printed output product from the discharge tray. Such period of time when the printing apparatus is forced to wait for the operation of the operator and the print processing is temporarily stopped is called "downtime". Once downtime occurs, the print processing is not resumed until the operator has completed necessary operation. In addition, the decrease in a fixing temperature in the printing engine requires heating processing to be performed again, and this takes a long time to be ready for performing the printing processing again.

Accordingly, a method for enabling the operator to perform necessary processing prior to the occurrence of downtime has been proposed.

For example, in a method discussed in Japanese Patent Application Laid-Open No. 2004-330781, print time estimation for each job is displayed in a graph. In this graph, the color of the time estimated for the supply and replacement of a consumable material is changed and displayed in the graph to enable the operator to recognize in advance when the supply and replacement work is to be done. This enables the operator to supply and replace the necessary consumable material before the material runs out to prevent the occurrence of downtime.

According to the above-described Japanese Patent Application, the operator is able to know in advance the time when an operation is to be done. The time should be exact, however, the accuracy is not perfect since the time is an estimated time, and some estimation error is included. The estimation error factors include warm-up processing of the printing engine. In a state where the printing engine is ready for printing, the estimation of a print time is relatively easy. On the other hand, when the printing engine requires warm-up processing, in addition to the time necessary for actual print processing, the warm-up time needs to be estimated.

The time necessary for the warm-up processing largely differs depending on the conditions of the printing engine at the time when the print job starts. At the time right after the start of the printing engine, when the printing apparatus is in a power saving mode after non-use state of the printing apparatus, or when long downtime occurs, heating operation and various kinds of preparation processing of a printing engine fixing unit are necessary. Consequently, the warm-up processing takes a long time. Especially, the time necessary for the warm-up processing increases as the size of the printing engine increases, and, in some cases, it takes several tens of minutes.

SUMMARY OF THE INVENTION

According to an aspect of the present invention, a printing apparatus includes a storing unit configured to store a job, a printing unit configured to print the job, an acquiring unit configured to acquire a preparation time for the printing unit to become a print-ready state, a determining unit configured to determine a print time for the printing unit to process the job, a specifying unit configured to specify a time for processing the job stored in the storing unit based on the preparation time acquired by the acquiring unit and the print time determined by the determining unit, and a displaying unit configured to display a job execution schedule indicating the job processing time specified by the specifying unit.

Further features of the present invention will become apparent from the following description of exemplary embodiments with reference to the attached drawings.

BRIEF DESCRIPTION OF THE DRAWINGS

FIG. 3 illustrates a warm-up time estimation table managed by the printing apparatus.

FIG. 5 illustrates an example of a user interface (UI) screen to be displayed on an operation panel.

FIG. 7 illustrates a necessary fixing temperature calculation table managed by the printing apparatus.

DESCRIPTION OF THE EMBODIMENTS

Various exemplary embodiments, features, and aspects of the invention will be described in detail below with reference to the drawings.

Figure 1:
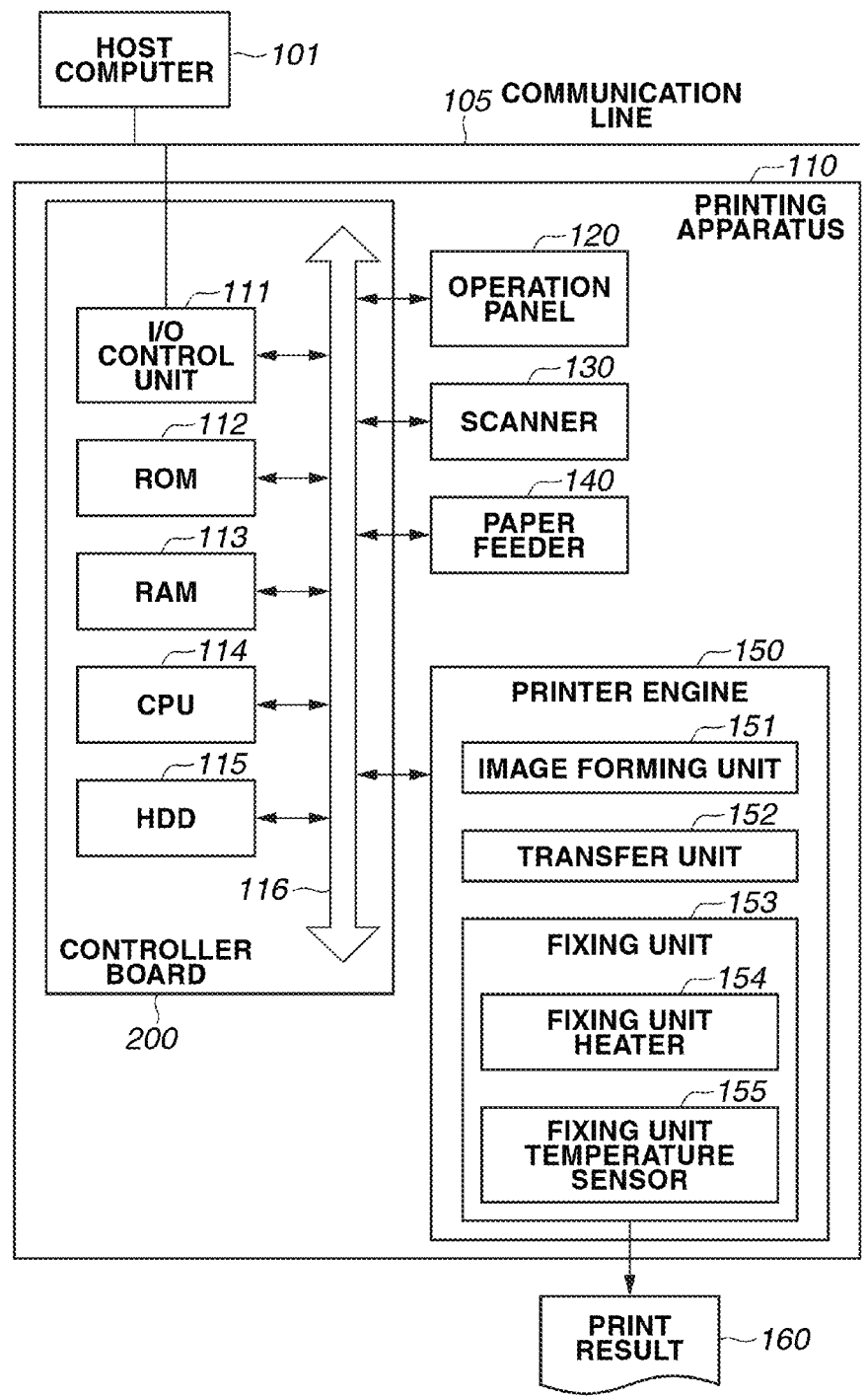
FIG. 1 is a block diagram illustrating a schematic configuration of hardware in a printing system.

FIG. 1 is a block diagram illustrating a schematic configuration of hardware in a printing system to which a printing apparatus according to an exemplary embodiment of the present invention is applied. As long as not specifically mentioned, the exemplary embodiments of the present invention can be applied to a system in which connection can be performed via a network such as a local area network (LAN) or a wide area network (WAN) and processing can be performed as far as functions according to the exemplary embodiments of the present invention can be implemented. As illustrated in FIG. 1, a printing system according to the exemplary embodiment includes a host computer 101 and a printing apparatus 110. The host computer 101 and the printing apparatus 110 are interconnected via a communication line 105. In this exemplary embodiment, a plurality of apparatuses such as host computers and printing apparatuses can be connected.

In FIG. 1, the host computer 101 can acquire input information from a user via an input device (not illustrated), generate a print job to be transmitted to the printing apparatus 110, and transmit the print job to the printing apparatus 110. A controller board 200 performs various kinds of data processing, and controls an operation of the printing apparatus 110. An operation panel 120 is a touch panel, and receives various kinds of operations from the user. A scanner 130 scans an original document with an optical sensor to acquire scanned image data.

A paper feeder 140 includes a plurality of paper feed stages. Each paper feed stage can store various types of printing paper. On each paper feed stage, only the uppermost sheet of the stored paper can be separated and conveyed to a printer engine 150. The printer engine 150 physically prints image data on the printing paper. A print result 160 indicates a printed result.

A configuration of the controller board 200 is now described.

An input/output (I/O) control unit 111 performs communication control with an external network. A read-only memory (ROM) 112 stores various kinds of control programs. A random access memory (RAM) 113 reads the control program stored in the ROM 112 and stores the program. A central processing unit (CPU) 114 executes the control program read in the RAM 113, and performs overall control of image signals and various types of devices.

A hard disk drive (HDD) 115 is used to store large amounts of data such as image data and print data temporarily or for long periods. Modules are interconnected via a system bus 116. The system bus 116 further interconnects a controller box and each device in the printing apparatus 110. The RAM 113 also serves as a main memory and a work memory of the CPU 114.

The control programs and the operating system are stored in the HDD 115 in addition to the ROM 112. Further, a nonvolatile RAM (NVRAM) (not illustrated) can be provided to store printing apparatus mode setting information from the operation panel 120. The HDD 115 is also used as a means to store jobs.

Hereinafter, a configuration of the printer engine 150 is described. An image forming unit 151 forms a toner image according to bitmap data generated by the controller board 200. The image forming unit 151 includes a photosensitive drum (not illustrated). The image forming unit 151 irradiates the photosensitive drum with a laser beam to form a toner image on a surface of the charged photosensitive drum. A transfer unit 152 transfers the toner image formed by the image forming unit 151 on printing paper.

A fixing unit 153 fixes the toner image transferred on the printing paper. The fixing unit 153 includes a pressure roller and a heating roller (not illustrated). The fixing unit 153 passes the paper between the rollers to melt and press the toner to fix the toner image on the printing paper. A fixing unit heater 154 heats the fixing unit 153 to maintain a temperature necessary for the fixing unit 153 to melt the toner. A fixing unit temperature sensor 155 is used to detect a current temperature in the fixing unit 153.

Figure 2:
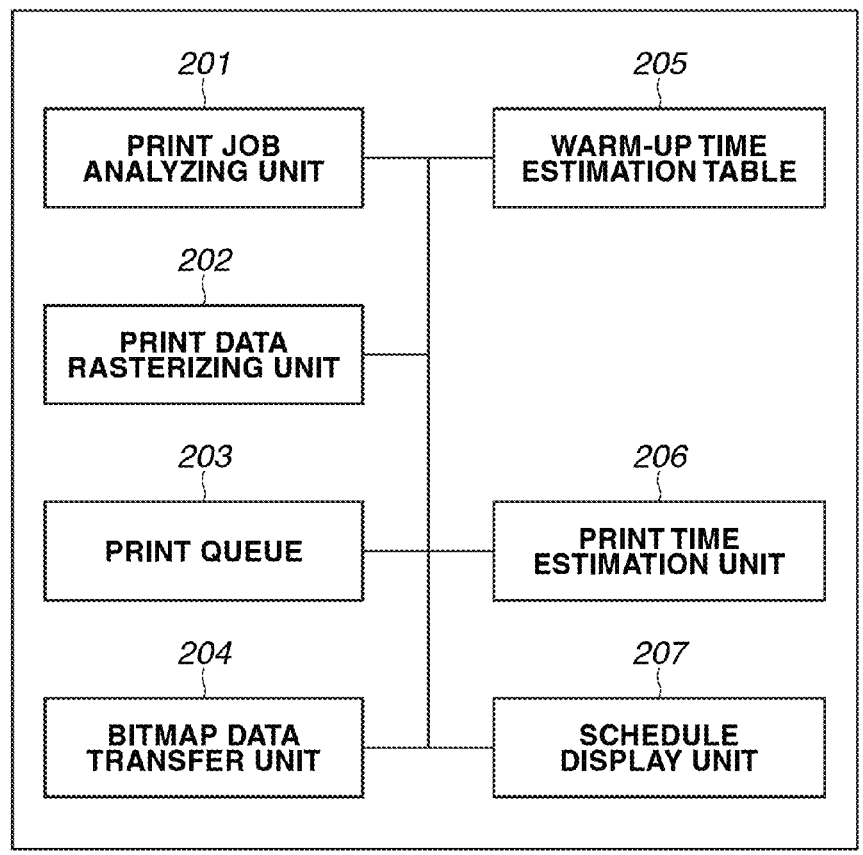
FIG. 2 is a block diagram illustrating a configuration of software modules in a printing apparatus.

FIG. 2 is a block diagram illustrating a configuration of software modules in the printing apparatus 110 illustrated in FIG. 1. These software modules are provided on the controller board 200, and stored in the ROM 112 or the HDD 115. The software modules are read into the RAM 113 and executed by the CPU 114 as necessary.

A print job analyzing unit 201 analyzes various print jobs received in the printing apparatus 110 such as a print job transmitted from the host computer 101 and a copy job generated in the printing apparatus 110, and reads print settings included in the print job. The print settings mainly include information about paper feed such as paper sizes, paper types, and paper feed stages to be used in printing, and information about finishing processing such as one-sided printing, two-sided printing, stapling, and bookbinding.

The print settings read by the print job analyzing unit 201 are temporarily stored in a storage device such as the RAM 113 and the HDD 115. A print data rasterizing unit 202 performs rasterization of print image data included in various print jobs received in the printing apparatus 110 to generate bitmap data printable in the printer engine 150. Generally, the print image data transmitted from the host computer 101 is described in a page description language (PDL), and the PDL is converted into the bitmap data.

In a case where print image data has been converted in bitmap data in advance, for example, in the host computer 101, the print data rasterizing unit 202 performs only color conversion processing for converting the image data into a color space corresponding to the printer engine 150. In a case of a copy job generated in the printing apparatus 110, rasterization of scanned image data read by the scanner 130 is performed to generate bitmap data. The bitmap data generated by the print data rasterizing unit 202 is temporarily stored in a storage device, for example, the HDD 115.

All print jobs received in the printing apparatus 110 are processed in the print job analyzing unit 201 and the print data rasterizing unit 202 while such information is transmitted to a print queue 203 and managed in an integrated fashion. The print queue 203 controls the printing order of the print jobs being managed, and performs print processing according to a predetermined order. The print-processed print job is deleted from the print queue 203. A bitmap data transfer unit 204, at the timing when the printing paper is conveyed from the paper feeder 140 to the printer engine 150, transfers the bitmap data generated by the print data rasterizing unit 202 to the printer engine 150.

A warm-up time estimation table 205 indicates a time necessary for warm-up processing corresponding to current temperatures of the fixing unit. An example of the warm-up time estimation table 205 is described below with reference to FIG. 3.

A print time estimation unit 206, to an arbitrary print job or an arbitrary page group in a print job, estimates a time necessary for printing the print job or the page group. The print time used herein means the time from when the printing actually starts in response to the completion of the warm-up processing of the printer engine till when the printing completes. The estimation of the print time is performed using the print settings of the print job read by the print job analyzing unit 201 and processing capability of the printer engine 150. The print time estimation unit 206 calculates, for each job stored in the HDD 115, a job processing time based on each preparation time and each print time according to the procedure illustrated in the flowchart described below. The preparation time used herein means the time necessary from the start of warm-up processing to the completion of the processing. In this exemplary embodiment, the necessary preparation time corresponding to detected temperature of the fixing unit is stored in a table. The print time estimation unit 206 refers to the table illustrated in FIG. 3 to acquire the preparation time.

The processing capability of the printer engine 150 is, for example, the time necessary to switch print speeds, and sizes and types of paper, the time necessary for various engine adjustments and cleaning, and the time necessary for finishing processing. A schedule display unit 207 displays a schedule screen on the operation panel 120. The schedule screen is an interface screen for displaying the print order of print jobs stored in the print queue 203, and the time when each of such print jobs will be executed. An example of the schedule screen to be displayed on the schedule display unit 207 is described below with reference to FIG. 5.

In the printing system of the above-described configuration, a flow of processing for displaying a schedule by the printing apparatus 110 is described.

FIG. 3 illustrates the warm-up time estimation table 205 being managed by the printing apparatus illustrated in FIG. 1.

In FIG. 3, a column 301 illustrates current temperatures of the fixing unit. A column 302 indicates a necessary warm-up time corresponding to the respective temperatures of the fixing unit indicated in the column 301. The necessary warm-up time is recorded in advance based on experimental results made by a printing apparatus manufacturer. The use of the warm-up time estimation table 205 enables to calculate a necessary warm-up time from a current temperature of the fixing unit. In FIG. 3, the current temperatures of the fixing unit indicated in the column 301 are shown in increments of five degrees. If a temperature of the fixing unit is an intermediate temperature of the two indicated temperatures of five degrees interval in the column 301, the warm-up time corresponding to the temperature can be calculated by interpolation based on the warm-up time corresponding to the preceding and subsequent temperature increments.

Figure 4:
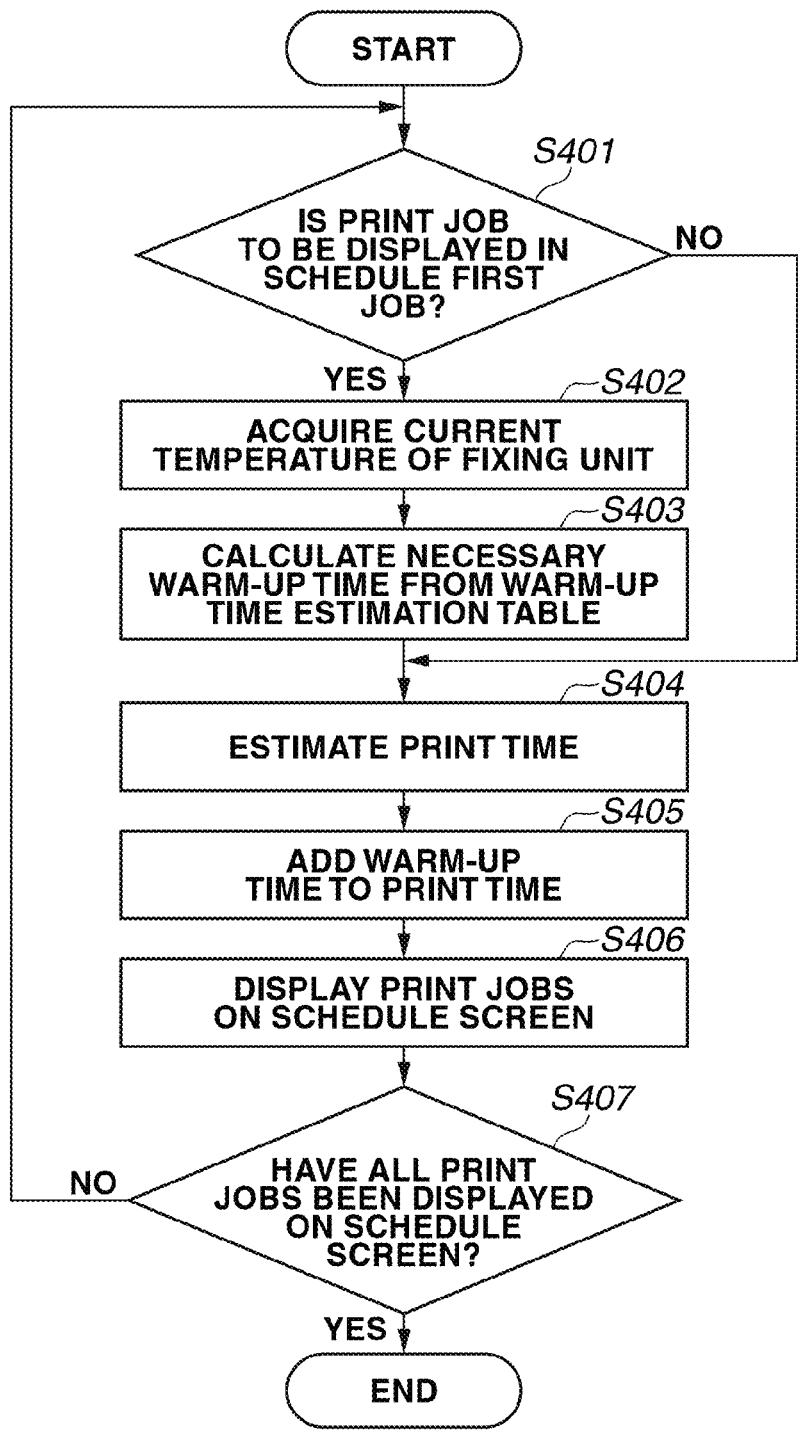
FIG. 4 is a flowchart illustrating a method of controlling the printing apparatus.

FIG. 4 is a flowchart illustrating a method of controlling the printing apparatus according to the exemplary embodiment. This exemplary embodiment is an example of display processing to be performed when the schedule display unit 207 illustrated in FIG. 2 displays a schedule screen. Each step is implemented by executing a control program stored, for example, in the ROM 112 or the HDD 115 by the CPU 114.

In step S401, the CPU 114 determines whether a print job to be displayed in the schedule is the first job in the print jobs stored in the print queue 203. The schedule display unit 207 displays, in the schedule, the print jobs stored in the print queue 203 from the first job. Consequently, when the processing in step S401 is performed first, the CPU 114 determines that the print job is the first job.

If the CPU 114 determines that the print job to be displayed in the schedule is the first job (YES in step S401), the processing proceeds to step S402. If the CPU 114 determines that the print job is not the first job (NO in step S401), the processing proceeds to step S404.

In step S402, using the fixing unit temperature sensor 155, the CPU 114 acquires the current temperature of the fixing unit 153, and then, the processing proceeds to step S403. In step S403, the CPU 114 referrers to the warm-up time estimation table 205, and calculates a necessary warm-up time from the current temperature of the fixing unit acquired in step S402. Then, the processing proceeds to step S404. In step S404, using the print time estimation unit 206, the CPU 114 estimates a print time necessary for printing the print job to be displayed in the schedule. Then, the processing proceeds to step S405.

In step S405, to the print time estimated in step S404, the CPU 114 adds the warm-up time calculated in step S403, and the processing proceeds to step S406. In step S401, if it is determined that the print job to be displayed in the schedule is not the first job (NO in step S401), it is determined that the warm-up time is zero (seconds). In step S406, the CPU 114 displays the print jobs in the schedule screen based on the time calculated in step S405 in a bar shape, and then the processing proceeds to step S407.

In step S407, the CPU 114 determines whether the processing of displaying all print jobs stored in the print queue 203 in the schedule has been completed. If the CPU 114 determines that the processing of displaying all print jobs stored in the print queue 203 in the schedule has been completed (YES in step S407), a series of the processes ends. In step S407, if the CPU 114 determines that there is a print job that has not been displayed in the schedule (NO in step S407), the process returns to step S401, and the processing of displaying the next print job in the schedule is continued.

The schedule screen displayed by the processing illustrated in FIG. 4 indicates the print time estimated at the time. Consequently, with passage of time, the information displayed on the schedule screen becomes inadequate. For this reason, the CPU 114 constantly updates the schedule display unit 207 to always provide an operator with an adequate estimated print time. In the processing in FIG. 4, in step S401, if the CPU 114 determines that the print job is not the first job, the processing in steps S402 and S403 is skipped. This is because the warm-up processing is not necessary for the print jobs after the second and the subsequent jobs since the jobs stored in the print queue 203 are sequentially printed.

FIG. 5 illustrates an example of a UI screen to be displayed on the operation panel 120 illustrated in FIG. 1. In this example, a job execution schedule screen to be displayed on the operation panel 120, when the CPU 114 instructs the schedule display unit 207 to perform the display processing, is described.

FIG. 5 illustrates a full interface screen 500 to be displayed on the operation panel 120. A table 510 indicates a schedule of the print jobs stored in the print queue 203. A horizontal axis 511 represents time scales that indicate time. A line 512 indicates print jobs that are estimated to be printed in the time periods displayed by the horizontal axis 511. FIG. 5 illustrates four print jobs Job 1 to Job 4 being displayed in the table. The displayed widths of the respective print jobs Job 1 to Job 4 change depending on the print time estimated by the print time estimation unit 206. The operator refers to the horizontal axis 511 and the line 512 to check the estimation of the start time and the end time of the respective print jobs.

A column 513 indicates paper to be consumed in printing the print jobs displayed in the line 512. The types and the number of sheets of the paper displayed in the column 513 change depending on the displayed print jobs. FIG. 5 indicates three types of paper 514 to 516 being displayed in the table. Display units 517 to 521 indicate time periods in which the paper displayed in the column 513 is to be consumed, the display units being displayed in the bar shapes. The operator can check the estimation of the time and types of paper to be used in advance by referring to the display units. On the screen in FIG. 5, in the display unit of the Job 1 as the first job, to the print time, the warm-up time of the fixing unit is added.

The above-described printing system enables the calculation of the warm-up time to be required depending on the current temperature of the fixing unit and the display of the warm-up time together with the print time estimation on the schedule screen. This enables the operator to more accurately recognize the print schedule and to appropriately do his/her work, and consequently, the convenience is increased.

In the first exemplary embodiment, based on a current temperature of the fixing unit, the warm-up time is calculated. Depending on the types of print paper to be used in a print job, however, the necessary warm-up time varies. For example, generally, printing paper having a large grammage requires a higher temperature of the fixing unit. That is, the printing paper having a large grammage requires a longer warm-up time than printing paper having a small grammage. In a second exemplary embodiment, an example is described that, depending on the current temperature of the fixing unit and the type of the printing paper to be used in a print job, an appropriate warm-up time can be calculated.

In the present exemplary embodiment, components different from those in the first exemplary embodiment are described, and the same reference numerals are applied to the similar components. A schematic configuration of hardware in a printing system according to the second exemplary embodiment is similar to that described in the first exemplary embodiment with reference to FIG. 1.

Figure 6:
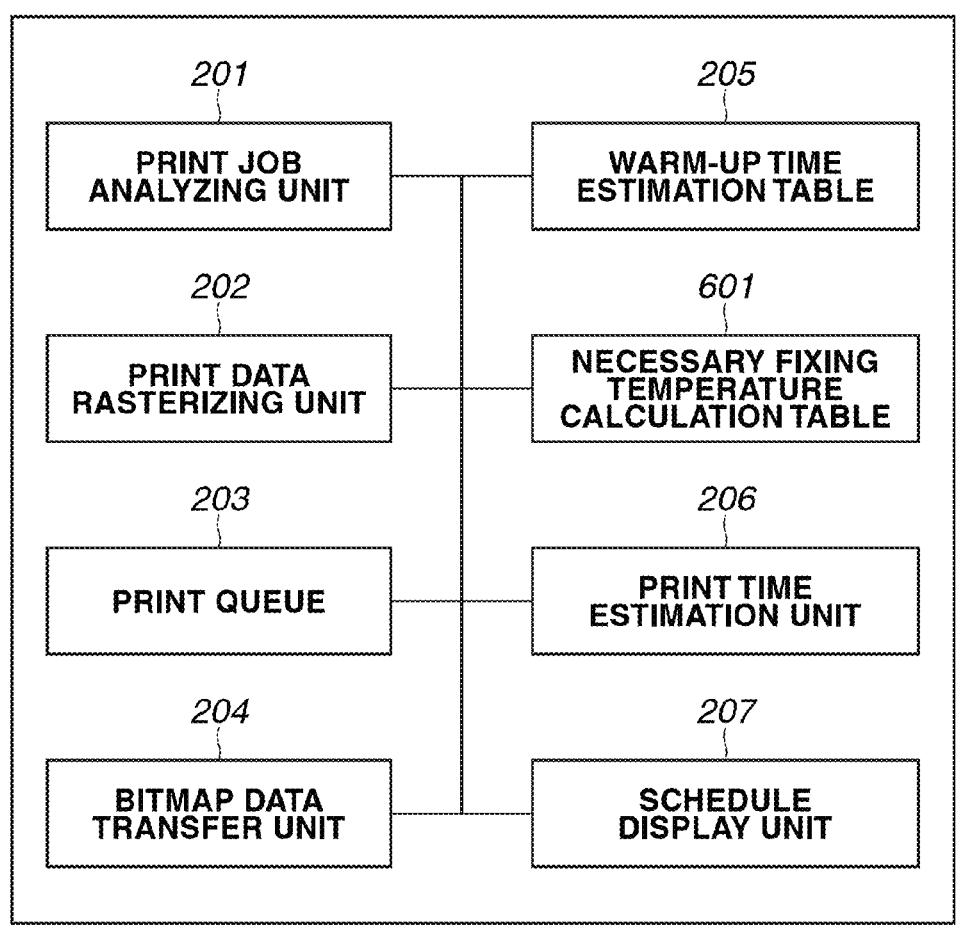
FIG. 6 is a block diagram illustrating a configuration of software modules in a printing apparatus.

FIG. 6 is a block diagram illustrating a configuration of software modules in the printing apparatus 110 illustrated in FIG. 1. As compared to the block diagram illustrated in FIG. 2, a necessary fixing temperature calculation table 601 is added.

In FIG. 6, the necessary fixing temperature calculation table 601 is used, depending on the respective printing paper types, in a fixing process. The necessary fixing temperature calculation table 601 indicates temperatures of the fixing unit. An example of the necessary fixing temperature calculation table 601 is described with reference to FIG. 7. In the printing system of the above-described configuration, a flow of the processing for displaying a schedule by the printing apparatus 110 is described.

FIG. 7 illustrates the necessary fixing temperature calculation table 601 being managed by the printing apparatus 110 illustrated in FIG. 1. In this exemplary embodiment, an example of a table that stores information of fixing temperatures to be set for respective sheet types is described.

In FIG. 7, a column 701 indicates printing paper types that can be processed in the print processing by the printing apparatus 110. A column 702 indicates fixing unit temperatures to be required for the fixing process depending on the printing paper types indicated in the column 701. The use of the necessary fixing temperature calculation table 601 enables the calculation of a fixing unit temperature to be required for the fixing process from the printing paper type.

Figure 8:
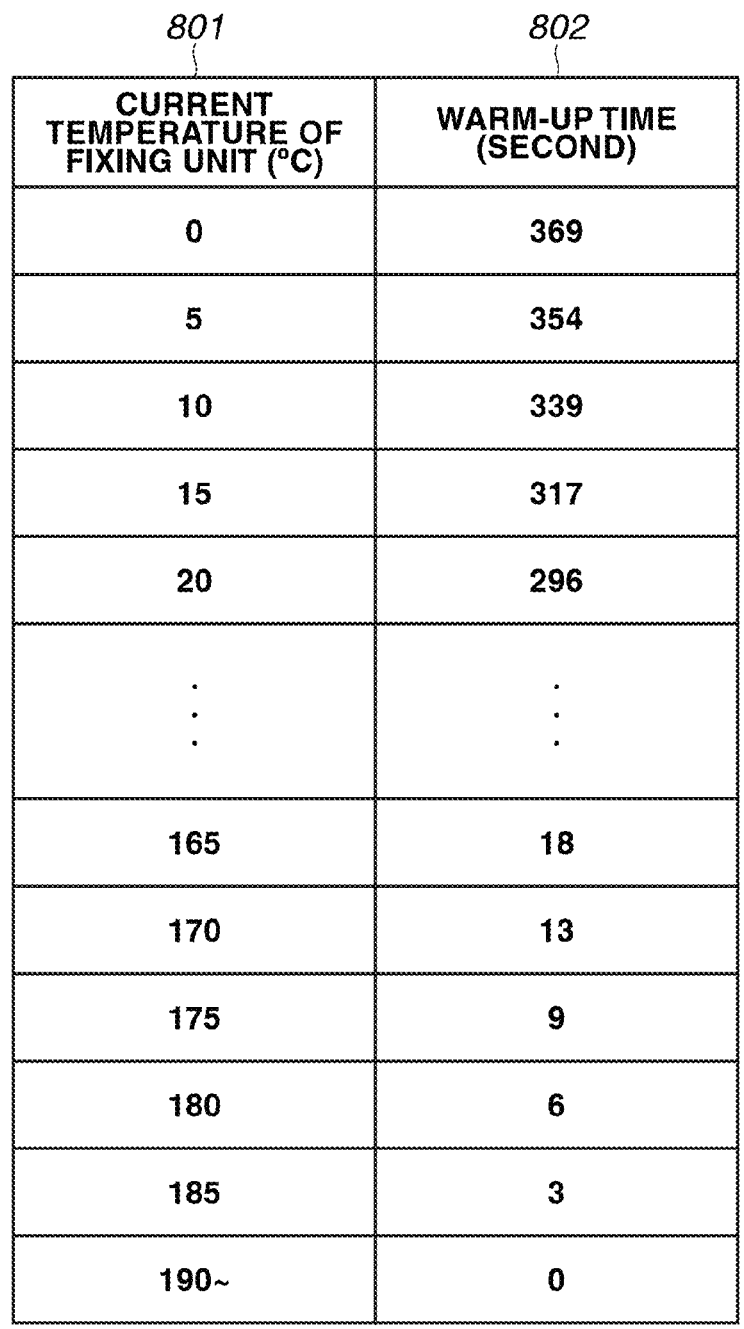
FIG. 8 illustrates a warm-up time estimation table managed by the printing apparatus.

FIG. 8 illustrates a warm-up time estimation table 205 being managed by the printing apparatus 110 illustrated in FIG. 1.

In FIG. 8, a column 801 indicates current temperatures of the fixing unit. A column 802 indicates a necessary warm-up time corresponding to the respective temperatures of the fixing unit indicated in the column 801. It is assumed that the necessary warm-up time based on experimental results conducted by the printing apparatus manufacturer is recorded in advance. The use of the warm-up time estimation table 205 enables to calculate a necessary warm-up time from a current temperature of the fixing unit.

In FIG. 8, the current temperatures of the fixing unit indicated in the column 801 are set in increments of five degrees. If a temperature of the fixing unit is an intermediate temperature of the two indicated temperatures of five degrees interval in the column 801, the warm-up time corresponding to the temperature can be calculated by interpolation based on the warm-up time corresponding to the preceding and subsequent temperature increments.

Figure 9:
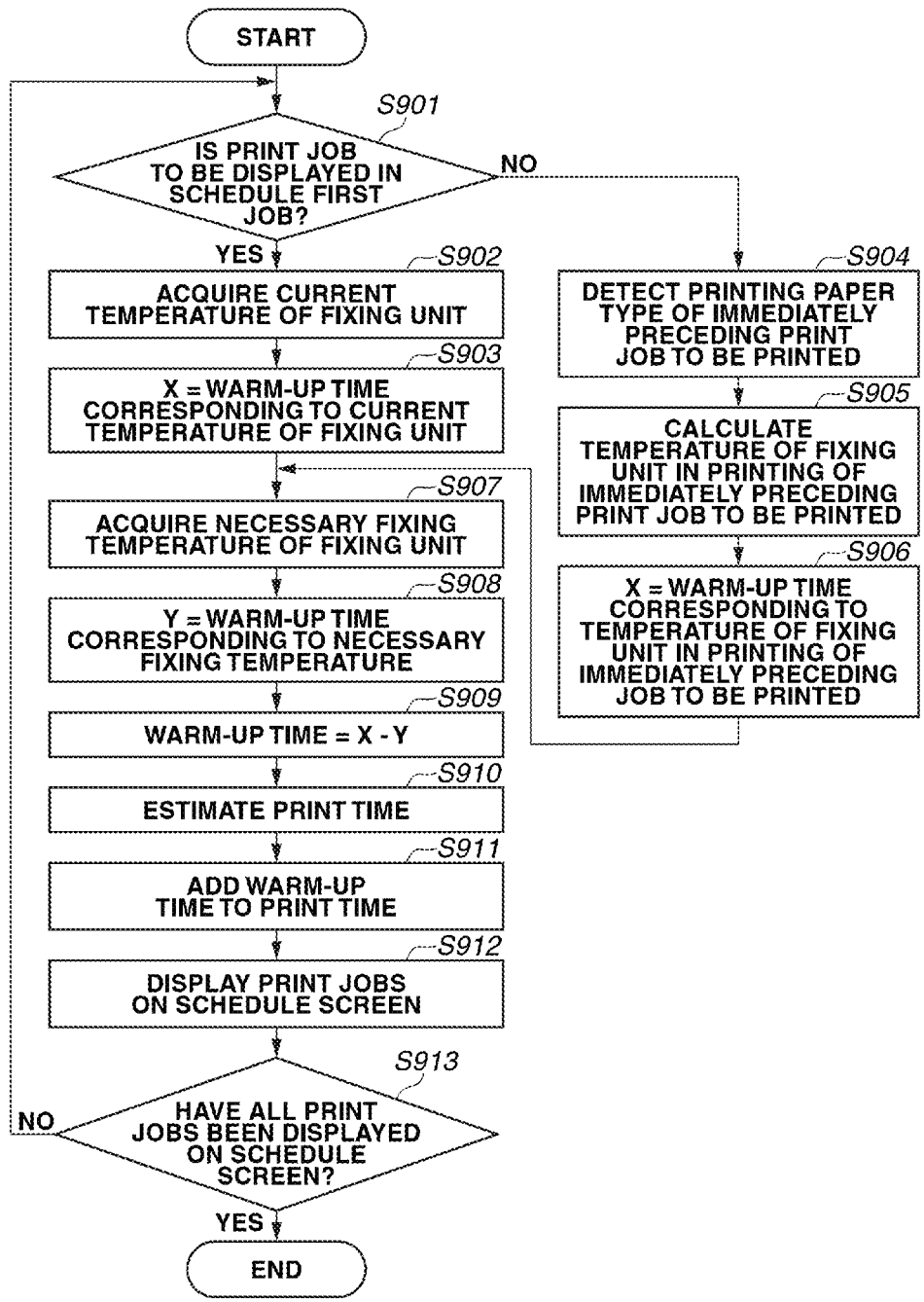
FIG. 9 is a flowchart illustrating a method of controlling the printing apparatus.

FIG. 9 is a flowchart illustrating a method of controlling the printing apparatus according to the exemplary embodiment. This exemplary embodiment is an example of the display processing to be performed when the schedule display unit 207 illustrated in FIG. 2 displays a schedule screen. Each step is implemented by executing a control program stored, for example, in the ROM 112 or the HDD 115 by the CPU 114.

In step S901, the CPU 114 determines whether a print job to be displayed in the schedule is the first job in the print jobs stored in the print queue 203. The schedule display unit 207 displays, in the schedule, the print jobs stored in the print queue 203 from the first job. Consequently, when the processing in step S901 is performed first, the CPU 114 determines that the print job is the first job. If the CPU 114 determines that the print job to be displayed in the schedule is the first job (YES in step S901), the processing proceeds to step S902. If the CPU 114 determines that the print job is not the first job (NO in step S901), the processing proceeds to step S904.

In step S902, using the fixing unit temperature sensor 155, the CPU 114 acquires the current temperature of the fixing unit 153, and then, the processing proceeds to step S903. In step S903, the CPU 114 stores the warm-up time corresponding to the current temperature of the fixing unit, which has been acquired in step S902, as a variable X, and then, the processing proceeds to step S907. The warm-up time corresponding to the current temperature of the fixing unit can be calculated by referring to the warm-up time estimation table 205.

In step S904, the CPU 114 detects the printing paper type of an immediately preceding print job to be printed before the print job to be displayed in the schedule, and then, the processing proceeds to step S905. In step S905, the CPU 114 calculates, from the printing paper type detected in step S904, the temperature of the fixing unit at the time of printing the immediately preceding print job to be printed, and then, the processing proceeds to step S906. The temperature of the fixing unit at the time of printing the immediately preceding print job to be printed can be calculated by referring to the necessary fixing temperature calculation table 601.

For example, in the immediately preceding print job to be printed, if "plain paper" is used as the printing paper, the temperature of the fixing unit at the time of the printing processing is 175 degrees. In step S906, the CPU 114 stores the warm-up time corresponding to the temperature of the fixing unit at the time of printing the immediately preceding print job to be printed, which has been calculated in step S905, as a variable X, and then, the processing proceeds to step S907.

The warm-up time corresponding to the temperature of the fixing unit at the time of printing the immediately preceding print job to be printed can be calculated by referring to the warm-up time estimation table 205.

In step S907, based on the print paper type to be used in the print job to be displayed in the schedule, the CPU 114 refers to the necessary fixing temperature calculation table 601, and calculates a necessary fixing temperature of the fixing unit for printing the print job. Then, the processing proceeds to step S908.

In step S908, the CPU 114 stores the warm-up time corresponding to the necessary fixing temperature of the fixing unit for printing the print job to be displayed in the schedule, which has been calculated in step S907, as a variable Y, and then, the processing proceeds to step S909.

The warm-up time corresponding to the necessary fixing temperature of the fixing unit for printing the print job to be displayed in the schedule can be calculated by referring to the warm-up time estimation table 205.

In step S909, the CPU 114 subtracts the variable Y from the variable X to calculate the warm-up time for the print job to be displayed in the schedule, and then, the processing proceeds to step S910. In step S910, using the print time estimation unit 206, the CPU 114 estimates a print time necessary for printing the print job to be displayed in the schedule. Then, the processing proceeds to step S911.

In step S911 the CPU 114 adds the warm-up time calculated in step S909 to the print time estimated in step S910, and the processing proceeds to step S912. In step S912, the CPU 114 displays the print jobs in the schedule screen based on the time calculated in step S911 in a bar shape, and then the processing proceeds to step S913. In step S913, the CPU 114 determines whether the processing of displaying all print jobs stored in the print queue 203 in the schedule has been completed. If the CPU 114 determines that the processing of displaying all print jobs stored in the print queue 203 in the schedule has been completed (YES in step S913), a series of the processes ends.

On the other hand, in step S913, if the CPU 114 determines that there is a print job that has not been displayed in the schedule (NO in step S913), the process returns to step S901, and the processing of displaying the next print job in the schedule is continued.

The schedule screen displayed by the processing illustrated in FIG. 9 indicates the print time estimated at the time. Consequently, with passage of time, the information displayed on the schedule screen becomes inadequate. For this reason, the CPU 114 constantly updates the schedule display unit 207 to always provide the operator with an adequate estimated print time.

The above-described printing system enables the calculation of the appropriate warm-up time depending on the current temperature of the fixing unit and the print paper type to be used in the print job, and the display of the warm-up time together with the print time estimation on the schedule screen. This enables the operator to more accurately understand the print schedule and to appropriately do his/her work, and consequently, the convenience is increased.

In the above-described second exemplary embodiment, depending on the current temperature of the fixing unit and the type of the printing paper to be used in a print job, an appropriate warm-up time is calculated. The warm-up time varies, however, depending on an ambient temperature (an ambient room temperature at the location where the printing apparatus has been installed) of the printing apparatus. Naturally, the decrease in the ambient temperature requires a longer warm-up time. In the third exemplary embodiment, depending on the ambient temperature of the printing apparatus, an appropriate warm-up time can be calculated. In this exemplary embodiment, components different from those in the second exemplary embodiment are described, and the same reference numerals are applied to similar components.

Figure 10:
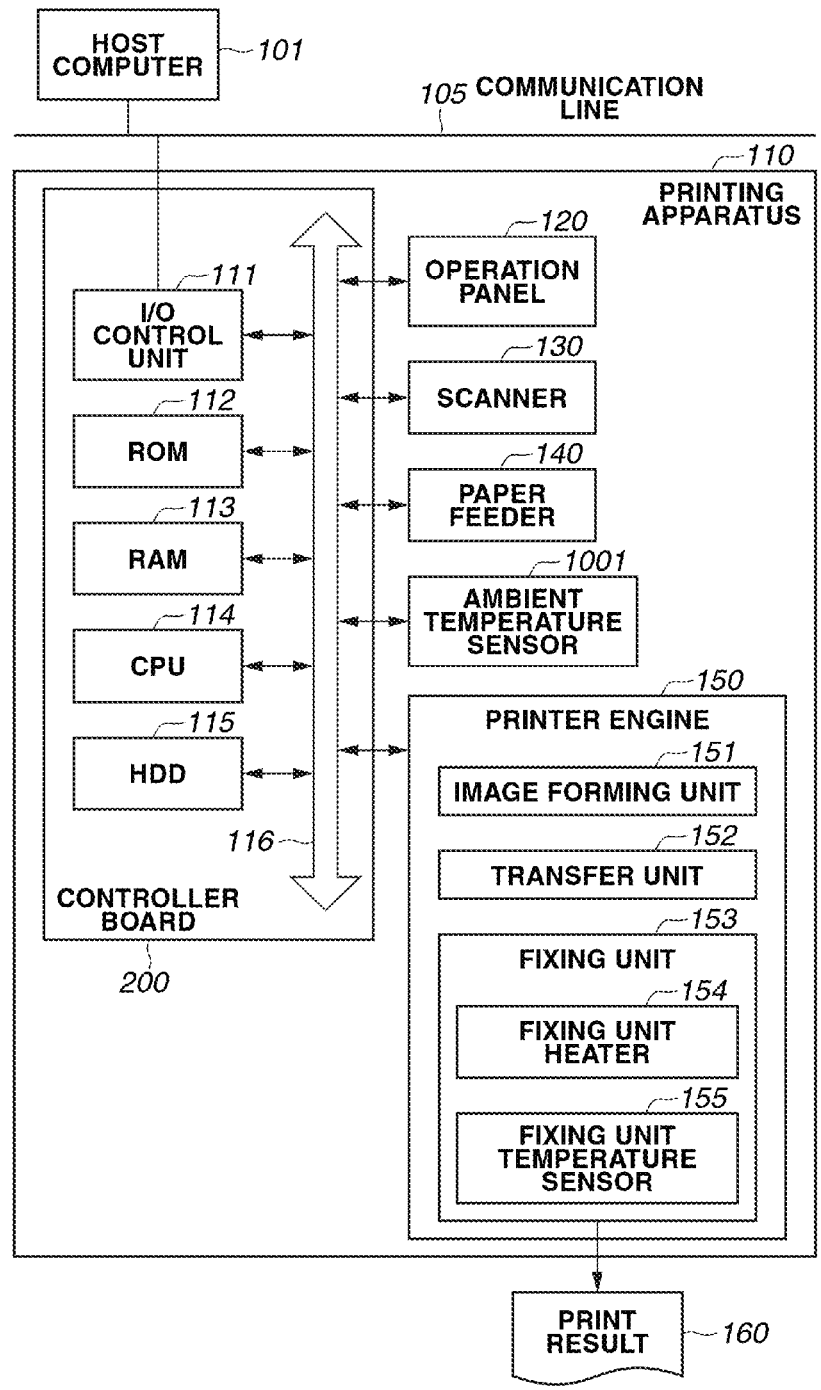
FIG. 10 is a block diagram illustrating a schematic configuration of hardware in a printing system.

FIG. 10 is a block diagram illustrating a schematic configuration of hardware in a printing system according to the present exemplary embodiment. As compared to the block diagram illustrated in FIG. 1, an ambient temperature sensor 1001 is added.

In FIG. 10, the ambient temperature sensor 1001 detects an ambient temperature of the printing apparatus 110. The ambient temperature is the temperature, for example, in the space (office space) where the printing apparatus 110 has been installed. The ambient temperature sensor 1001 periodically detects the ambient temperature, and updates and stores the information in the RAM 113.

Figure 11:
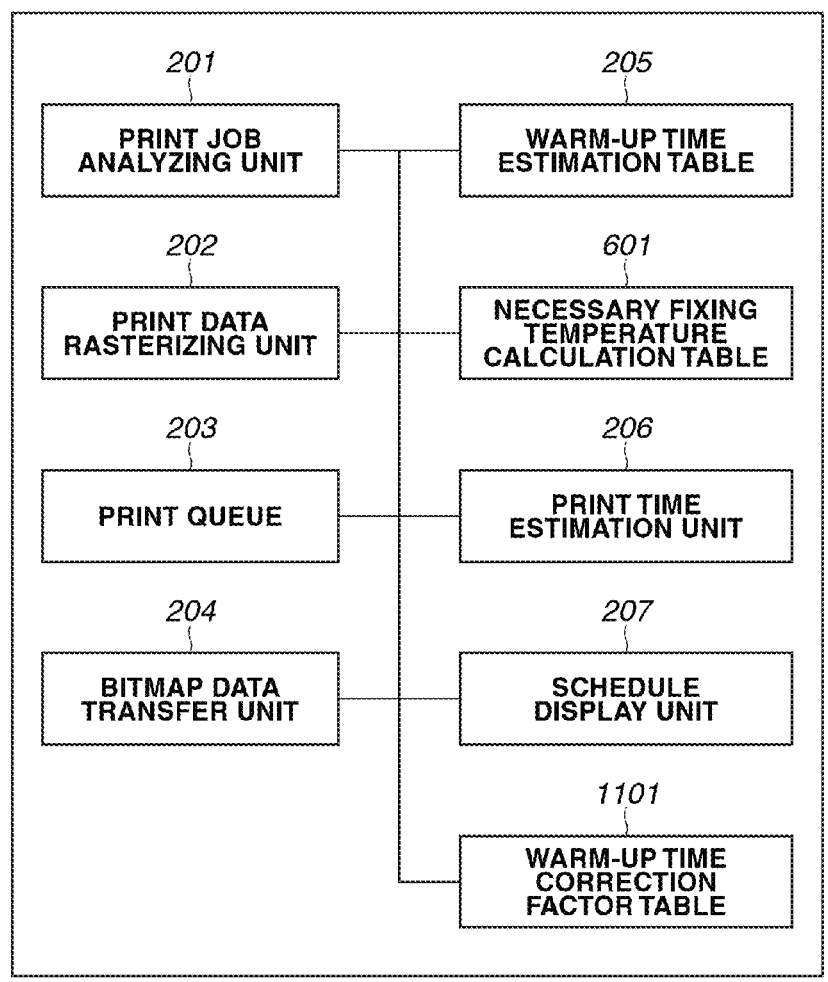
FIG. 11 is a block diagram illustrating a configuration of software modules in a printing apparatus.

FIG. 11 is a block diagram illustrating a configuration of software modules in the printing apparatus 110 illustrated in FIG. 10. As compared to the configuration illustrated in FIG. 6, a warm-up time correction factor table 1101 is added.

In FIG. 11, the warm-up time correction factor table 1101 indicates correction factors for correcting the warm-up time calculated depending on a current temperature of the fixing unit and a printing paper type to be used in the job to a more accurate warm-up time depending on an ambient temperature. An example of the warm-up time correction factor table 1101 is described with reference to FIG. 12. In the printing system of the above-described configuration, a flow of the processing for displaying a schedule by the printing apparatus 110 is described.

Figure 12:
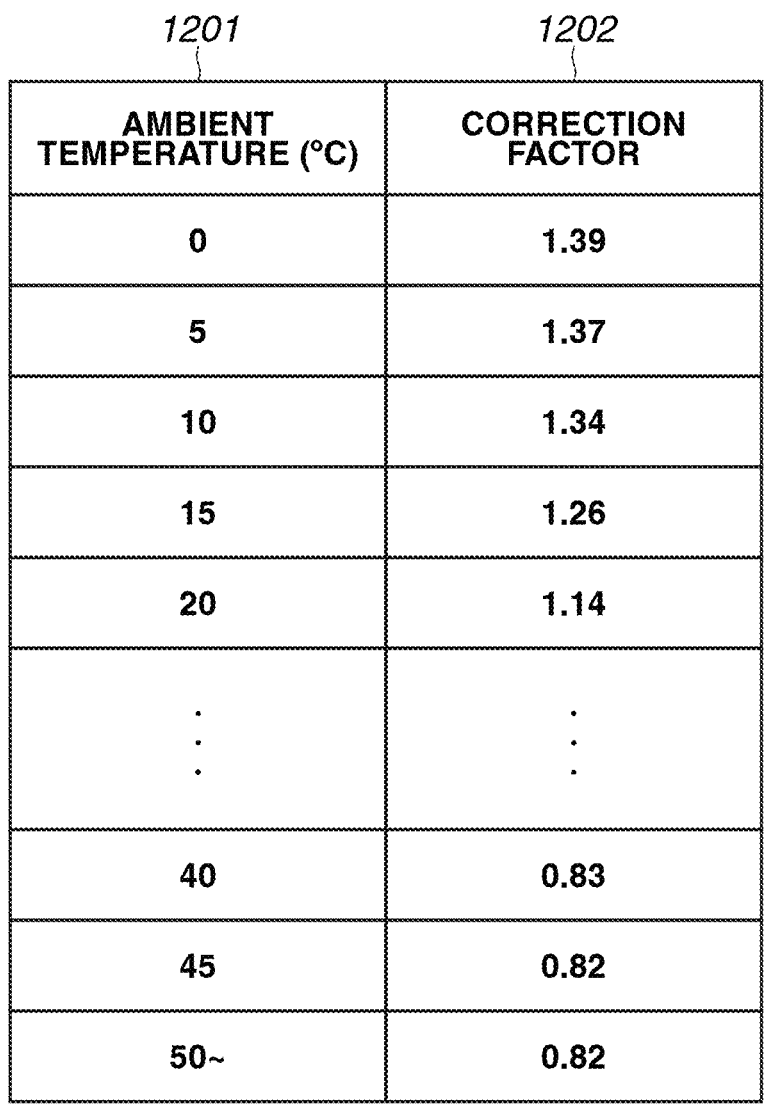
FIG. 12 illustrates a warm-up time correction table being managed by the printing apparatus.

FIG. 12 illustrates the warm-up time correction factor table 1101 being managed by the printing apparatus according to the present exemplary embodiment.

In FIG. 12, a column 1201 indicates ambient temperatures. A column 1202 indicates correction factors corresponding to the respective ambient temperatures indicated in the column 1201. It is assumed that the correction factors based on experimental results conducted by the printing apparatus manufacturer are recorded in advance. The use of the warm-up time correction factor table 1101 enables calculation of a correction factor from an ambient temperature.

The ambient temperatures indicated in the column 1201 are set in increments of five degrees. If an ambient temperature indicated in the column 1201 is an intermediate temperature of the two indicated temperatures of five degrees interval in the column 1201, the correction factor corresponding to the ambient temperature can be calculated by interpolation based on the correction factors corresponding to the preceding and subsequent temperature increments.

Figure 13:
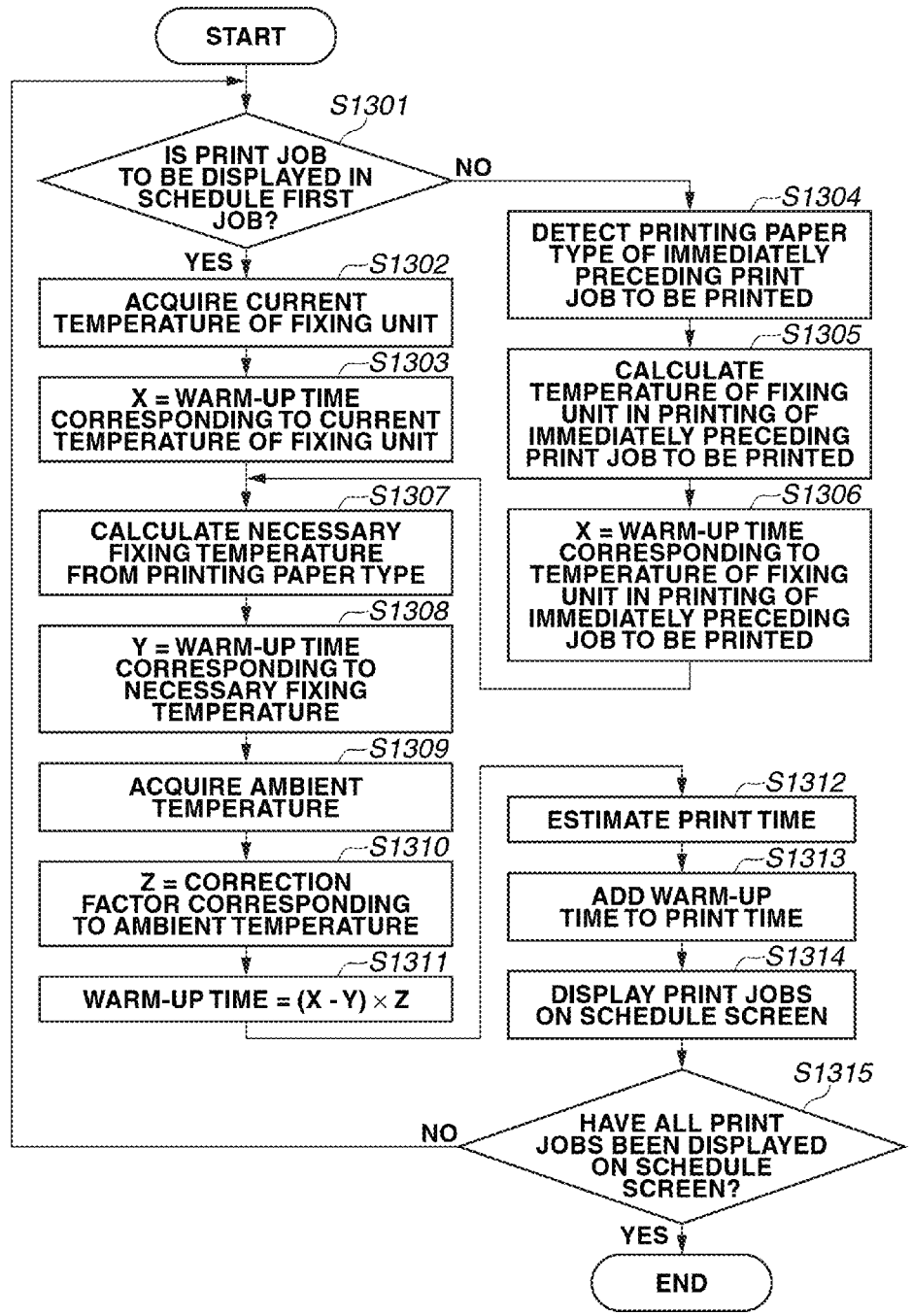
FIG. 13 is a flowchart illustrating a method of controlling the printing apparatus.

FIG. 13 is a flowchart illustrating a method of controlling the printing apparatus according to the present exemplary embodiment. This exemplary embodiment is an example of the display processing to be performed when the schedule display unit 207 illustrated in FIG. 2 displays a schedule screen. Each step is implemented by executing a control program stored, for example, in the ROM 112 or the HDD 115 by the CPU 114. The processing in step S1301 to step S1308 is similar to that in step S901 to step S908 illustrated in FIG. 9, and accordingly, its description is omitted.

In step S1309, using the ambient temperature sensor 1001, the CPU 114 acquires an ambient temperature of the printing apparatus 110, and then, the processing proceeds to step S1310. In step S1310, the CPU 114 stores the correction factor corresponding to the ambient temperature acquired in step S1309 as a variable Z, and then, the processing proceeds to step S1311. The correction factor corresponding to the ambient temperature can be calculated by referring to the warm-up time correction factor table 1101. In step S1311, the CPU 114 multiplies the value obtained by subtracting the variable Y from the variable X by the variable Z to calculate the warm-up time for the print job to be displayed in the schedule, and then, the processing proceeds to step S1312. In the flowchart in FIG. 13, the processing in step S1312 to step S1315 is similar to that in step S910 to step S913 illustrated in FIG. 9, and accordingly, its description is omitted.

The schedule screen displayed by the processing illustrated in FIG. 13 indicates the print time estimated at the time. Consequently, with passage of time, the information displayed on the schedule screen becomes inadequate. For this reason, the CPU 114 constantly updates the schedule display unit 207 to always provide the operator with an adequate estimated print time.

The above-described printing system enables the calculation of the appropriate warm-up time depending on, in addition to the current temperature of the fixing unit and the print paper type to be used in the print job, the ambient temperature of the printing apparatus, and the display of the warm-up time together with the print time estimation on the schedule screen. This enables the operator to more accurately understand the print schedule and to appropriately do his/her work, and consequently, the convenience is increased.

In the above-described first to third exemplary embodiments, the warm-up time calculated using the various tables is added to the estimated print time, and the time is displayed in bar shapes on the schedule screen. Consequently, by just looking at the schedule screen, the operator cannot determine whether the warm-up processing is necessary, or when the warm-up processing will be completed and actual printing processing will start.

Accordingly, in this exemplary embodiment, an example of display of the warm-up time and the actual time when the print processing is to start on a schedule screen for the operator to recognize the respective times is described. The schematic hardware configuration and software module configuration in the printing system according to the present exemplary embodiment are similar to those described with reference to FIG. 10 and FIG. 11 in the third exemplary embodiment. In the printing system of the above-described configuration, a flow of the processing for displaying the schedule by the printing apparatus 110 is described.

Figure 14:
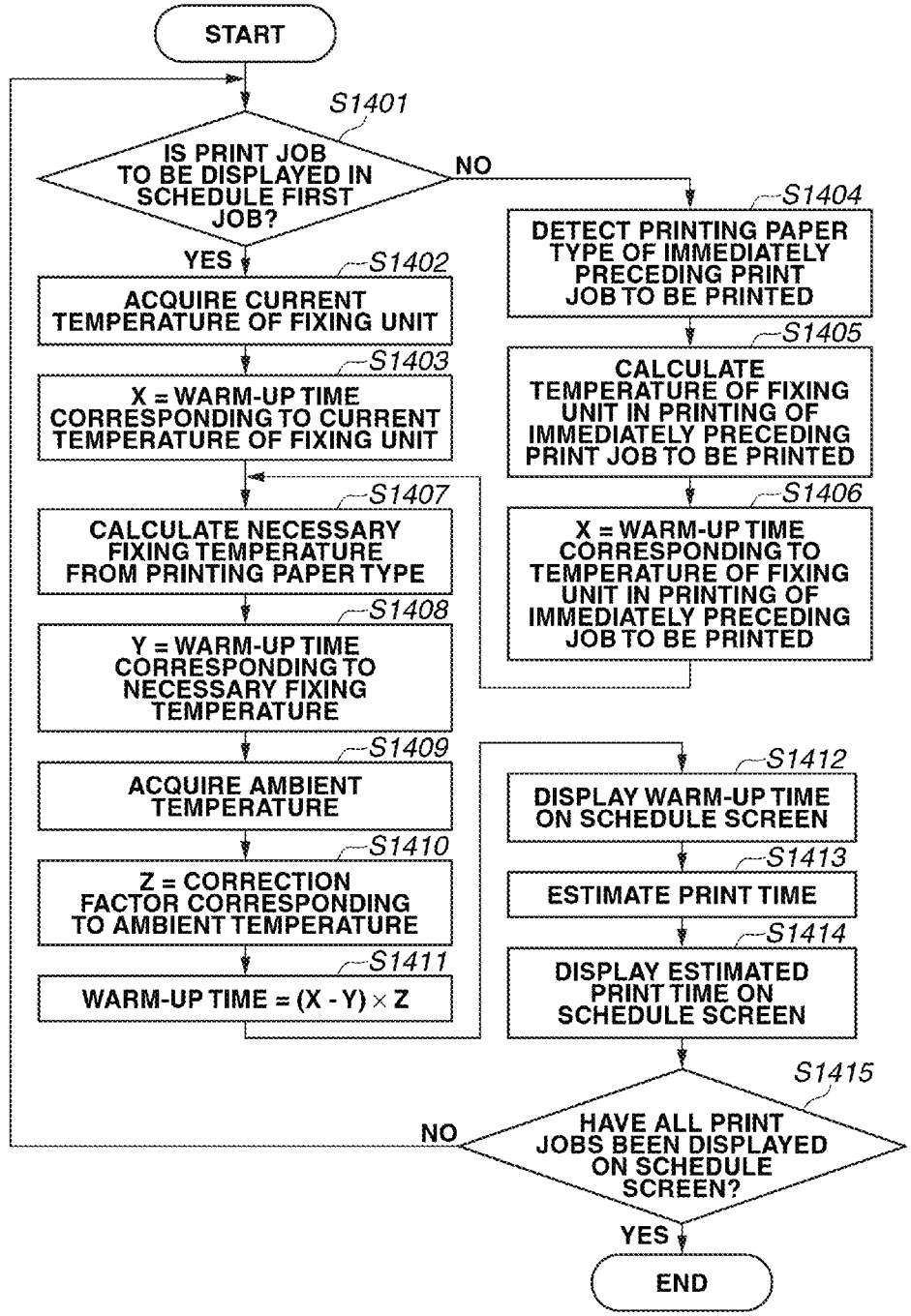
FIG. 14 is a flowchart illustrating a method of controlling the printing apparatus.

FIG. 14 is a flowchart illustrating a method of controlling the printing apparatus according to the present exemplary embodiment. This exemplary embodiment is an example of the display processing to be performed when the schedule display unit 207 illustrated in FIG. 2 displays a schedule screen. Each step is implemented by executing a control program stored, for example, in the ROM 112 or the HDD 115 by the CPU 114. The processing in step S1401 to step S1411 is similar to that in step S1301 to step S1311 illustrated in FIG. 13, and accordingly, its description is omitted.

In step S1412, the CPU 114 displays the display unit in a bar shape in the schedule screen based on the warm-up time calculated in step S1411, and then the processing proceeds to step S1413. In step S1413, using the print time estimation unit 206, the CPU 114 estimates a print time necessary for printing the print job to be displayed in the schedule. Then, the processing proceeds to step S1414. In step S1414, the CPU 114 displays the display unit in a bar shape in the schedule screen based on the print time calculated in step S1413, and then the processing proceeds to step S1415. The display unit displayed in step S1414 is displayed in a color and hatch pattern different from those of the display unit displayed in step S1412. The processing in step S1415 is similar to that in step S1315 in FIG. 13, and its description is omitted.

The schedule screen displayed by the processing illustrated in FIG. 14 indicates the print time estimated at the time. Consequently, with passage of time, the information displayed on the schedule screen becomes inadequate. For this reason, the CPU 114 constantly updates the schedule display unit 207 to always provide the operator with an adequate estimated print time.

Figure 15:
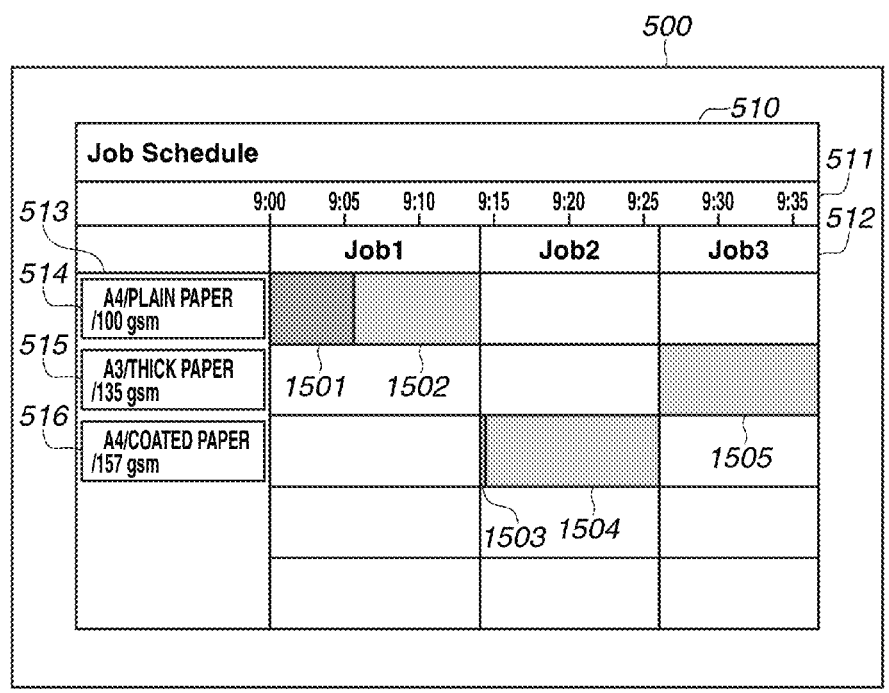
FIG. 15 illustrates an example of the UI screen to be displayed on the operation panel.

FIG. 15 illustrates an example of the UI screen to be displayed on the operation panel 120 illustrated in FIG. 1. In this example, a schedule screen to be displayed on the operation panel 120 when the CPU 114 instructs the schedule display unit 207 to perform the display processing is described. In this example, in respective calculated job processing times, the preparation time and the print time are independently displayed for the user to easily and visually recognize a job execution schedule.

In FIG. 15, display units 1501 to 1505 are indicated in bar shapes. The display units 1501 and 1503 respectively indicate the warm-up time, and the display units 1502, 1504, and 1505 respectively indicate the time when the print processing is to be performed. The schedule screen in FIG. 15 differs from that in FIG. 5 in that the warm-up time and the time when the print processing is to be performed are displayed in different hatch patterns in the display units 1501 to 1505.

The display unit 1501 indicates the warm-up time with regard to the Job 1, and the display unit 1503 indicates the warm-up time with regard to the Job 2. The Job 1 requires a long time for the rise of temperature of the fixing unit as the Job 1 is the first job, and the display unit 1501 is displayed as a relatively long time. The temperature of the fixing unit has been maintained at a high temperature as the print processing of the Job 1 has been done immediately before the execution of the Job 2. Consequently, for the warm-up time, a time necessary to increase the temperature of the fixing unit only by the difference from the fixing unit temperature for performing printing onto coated paper is necessary, and thus the warm-up time 1503 is displayed as a relatively short time. In the case of the Job 3, the temperature of the fixing unit has already been increased to the temperature necessary to perform printing onto thick paper as the print processing of the Job 2 has been done immediately before the execution of the Job 3. Consequently, the warm-up time is not needed.

The above-described printing system enables the display of the warm-up time and the actual time when the print processing is to start on the schedule screen for the operator to recognize the respective times. This enables the operator to more accurately understand the print schedule and to appropriately do his/her work, and consequently, the convenience is increased.

In above-described exemplary embodiments, as the warm-up time, processing of heating the fixing unit has been described as an example. In addition to the processing, the warm-up time may include a starting time of the printing engine, and processing necessary to become a print-ready state such as various adjustment processes. Further, in the above-described exemplary embodiments, the printing engine and the controller board are provided in the same apparatus. Alternatively, the present invention can be applied to an apparatus having the printing engine and the controller board being independently provided.

Each step in the exemplary embodiments of the present invention can be implemented by executing software (program) acquired via a network or various storage media using a processing device (CPU or processor) such as a personal computer (PC).

It is to be understood that the invention is not limited to the disclosed exemplary embodiments, and various modifications (including organic combinations of the exemplary embodiments) can be made without departing from the scope of the invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-127238 filed Jun. 18, 2013, which is hereby incorporated by reference herein in its entirety.

What is claimed is:

1. A printing apparatus comprising:
a storing unit configured to store a job;
a printing unit configured to print an image on a sheet;
a first determining unit configured to determine a preparation time of the printing unit to become a print-ready state for a first job stored in the storing unit, based on a necessary fixing temperature of a fixing unit of the printing unit for printing an image on a sheet to be used in a second job, the first job being to be processed in accordance with completion of processing the second job;
a second determining unit configured to determine a print time for the printing unit to print an image on a sheet to be used in the first job stored in the storing unit; and
a displaying unit configured to display time information including the preparation time determined by the first determining unit and the print time determined by the second determining unit.

2. The printing apparatus according to claim 1, wherein the first determining unit determines the preparation time, based on the necessary fixing temperature of the fixing unit of the printing unit for printing the image on the sheet to be used in the second job and another necessary fixing temperature of the fixing unit of the printing unit for printing an image on a sheet to be used in the first job.

3. The printing apparatus according to claim 2, further comprising:
a holding unit configured to hold the necessary fixing temperature of the fixing unit of the printing unit for printing the image of the sheet to be used in the second job and the another necessary fixing temperature of the fixing unit of the printing unit for printing the image on the sheet to be used in the first job,
wherein the first determining unit determines the preparation time, based on the necessary fixing temperature held by the holding unit and the another necessary fixing temperature held by the holding unit.

4. The printing apparatus according to claim 1, further comprising:
a detecting unit configured to detect an ambient temperature of the printing apparatus,
wherein the first determining unit determines the preparation time, based on the necessary fixing temperature of the fixing unit of the printing unit for printing the image on the sheet to be used in the second job and the ambient temperature detected by the detecting unit.

5. The printing apparatus according to claim 1, wherein the displaying unit displays the time so that the preparation time determined by the first determining unit is able to be discriminated from the print time determined by the second determining unit.

6. The printing apparatus according to claim 1, wherein the preparation time is a time for heating the fixing unit.

7. The printing apparatus according to claim 1, wherein the preparation time is a time for starting a printing engine.

8. A method of controlling a printing apparatus having a storing unit configured to store a job, and a printing unit configured to print an image on a sheet, the method comprising:
determining a preparation time of the printing unit to become a print-ready state for a first job stored in the storing unit, based on a necessary fixing temperature of a fixing unit of the printing unit for printing an image on a sheet to be used in a second job, the first job being to be processed in accordance with completion of processing the second job;
determining a print time for the printing unit to print an image on a sheet to be used in the first job stored in the storing unit; and
displaying time information including the determined preparation time and the determined print time.

9. A non-transitory computer-readable storage medium storing a program for instructing a computer to execute a method of controlling a printing apparatus having a storing unit configured to store a job, and a printing unit configured to print an image on a sheet, the program comprising:
a code for determining a preparation time of the printing unit to become a print-ready sate for a first job stored in the storing unit, based on a necessary fixing temperature of a fixing unit of the printing unit for printing an image on a sheet to be used in a second job, the first job being to be processed in accordance with completion of processing the second job;
a code for determining a print time for the printing unit to print an image on a sheet to be used in the first job stored in the storing unit; and
a code for displaying time information including the determined preparation time and the determined print time.

* * * * *